United States Patent [19]

Mattson et al.

[11] Patent Number: 5,667,160
[45] Date of Patent: Sep. 16, 1997

[54] MICROFILM CARTRIDGE ASSEMBLY WITH INTEGRAL HUB SYSTEM

[75] Inventors: Carl G. Mattson, Foxborough; Eric C. Carter, Norton, both of Mass.

[73] Assignee: The Foxx Group, Inc., Topsfield, Mass.

[21] Appl. No.: 565,791

[22] Filed: Dec. 1, 1995

[51] Int. Cl.⁶ .................................................. G11B 23/07
[52] U.S. Cl. ........................................ 242/348; 242/326.3
[58] Field of Search .......................... 242/326.2, 326.3, 242/327, 345, 348, 348.3; 353/26 R

[56] References Cited

U.S. PATENT DOCUMENTS

| | | | |
|---|---|---|---|
| 2,837,332 | 6/1958 | Busch | 242/326.2 |
| 3,025,012 | 3/1962 | Fries | 242/326.3 |
| 3,161,362 | 12/1964 | Smith, II | 242/326.2 |
| 4,555,077 | 11/1985 | Platter et al. | 242/345 |

*Primary Examiner*—John P. Darling
*Attorney, Agent, or Firm*—Salter & Michaelson

[57] ABSTRACT

A microfilm cartridge assembly is effective for increased transfer speed of film and for reduced noise levels during winding. The microfilm cartridge assembly includes a housing having front and rear spaced walls, a centrally located post extending inwardly into the housing from the rear wall, and a cylindrical retaining wall disposed between the front and rear walls. The microfilm cartridge assembly further includes a reel having a hub centered about an axis of rotation of the reel. The reel is received within the housing with the hub received on the housing post for rotation thereon. The hub of the reel has a depth which is slightly less than the maximum height of the post such that the reel is suspended above the rear wall of the housing when the hub is received on the post. The post is preferably tapered upwardly to a point at its central axis to define a single point of contact with the hub. More specifically, the post is formed with a convex upper surface wherein the apex of the concave surface defines the single point of contact.

15 Claims, 2 Drawing Sheets

MICROFILM CARTRIDGE ASSEMBLY WITH INTEGRAL HUB SYSTEM

BACKGROUND AND SUMMARY OF THE INVENTION

The instant invention relates to microfilm storage and retrieval systems, and more particularly to a microfilm cartridge assembly for storing microfilm in reel form.

Microfilm storage and retrieval systems are well known in the art. In this regard, microfilm is typically stored in a cartridge assembly comprising a free-spinning reel which is received inside cylindrical retaining walls of a housing. In use, the cartridge assembly is snapped into a retrieval apparatus, wherein the cartridge reel is engaged by a spindle of the retrieval system. The spindle then rotates to wind and unwind the film from the reel for viewing. While the prior art microfilm cartridges are adequate for their intended purpose, there are nevertheless several drawbacks in the prior art designs. The single most significant drawback to the prior art cartridge assemblies is a limitation of the speed at which the film can be wound an unwound from the reel. Since the reel is free to move laterally within the confines of the internal retaining wall of the housing, the edges of the reel are pulled into engagement with the internal retaining wall by the rotation of the film, and the rear flange of the reel is driven into contact with the rear wall of the housing. This engagement causes friction between the edges of the reel and the inner retaining walls of the housing; as well as the rear flange of the reel and the rear wall of the housing. The friction binds rotation of the reel and thus limits the speed at which the film can be wound and unwound. Furthermore, the binding can be a problem in cartridge drives which are old, worn, or out of adjustment. Excessive friction and binding of the reel may cause such machines to jam or malfunction. The friction also generates heat which can melt or deform the structure of the housing and the reel, if the reel is wound too fast. Heat damaged and deformed cartridges need to be replaced to maintain access to the microfilm. Still further, friction causes the reel to vibrate and produce unwanted noise during rapid rotation.

The instant invention provides a microfilm cartridge assembly including an integral post and hub arrangement which is operative for stabilizing rotation of the reel within the cartridge housing, increasing possible rotation speeds, reducing friction, and reducing noise levels. More specifically, the microfilm cartridge assembly comprises a housing having front and rear generally parallel, spaced walls, a centrally located post extending perpendicularly inwardly into the housing from the rear wall, and a cylindrical retaining wall disposed between the front and rear walls. The microfilm cartridge assembly further comprises a reel having a hub centered about an axis of rotation of the reel. The hub of the reel is received on the housing post for rotation within the confines of the walls of the housing. The front wall of the housing includes a central opening for permitting engagement of a retrieval spindle with the reel. The most important aspect of the invention is that the hub of the reel is formed with a depth which is slightly less than the maximum height of the post such that the reel is suspended above the rear wall of the housing when the hub is received on the post. The post is preferably tapered upwardly to a point at its central axis to define a single point of contact with the hub. The hub along with the tapered point of contact permits the reel to float within the housing thereby reducing friction between the reel and the housing walls.

Accordingly, among the objects of the instant invention are the provision of a microfilm cartridge assembly wherein the film on the reel can be transferred at a faster speed than currently possible; the provision of a microfilm cartridge assembly which reduces friction and binding of the reel within the cartridge housing; and the provision of a microfilm cartridge assembly which is substantially quieter than the currently available cartridges.

Other objects, features and advantages of the invention shall become apparent as the description thereof proceeds when considered in connection with the accompanying illustrative drawings.

DESCRIPTION OF THE DRAWINGS

In the drawings which illustrate the best mode presently contemplated for carrying out the present invention.

DESCRIPTION OF THE PREFERRED EMBODIMENT

Figure 1:
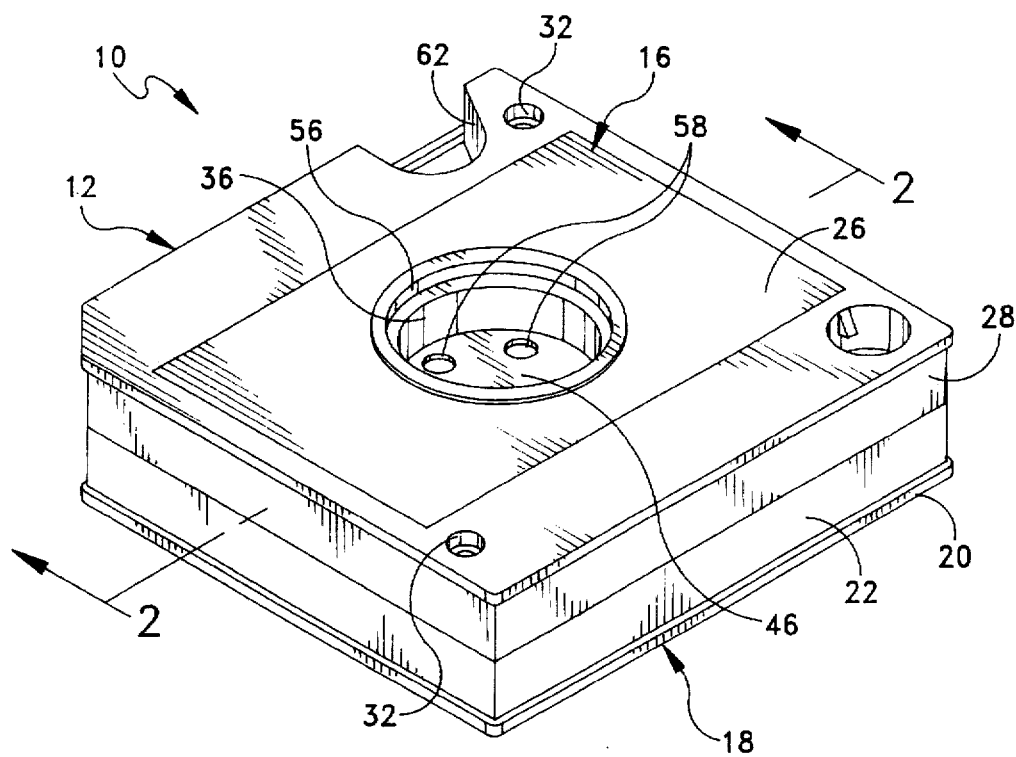
FIG. 1 is a perspective view of the microfilm cartridge assembly of the instant invention.
Figure 2:
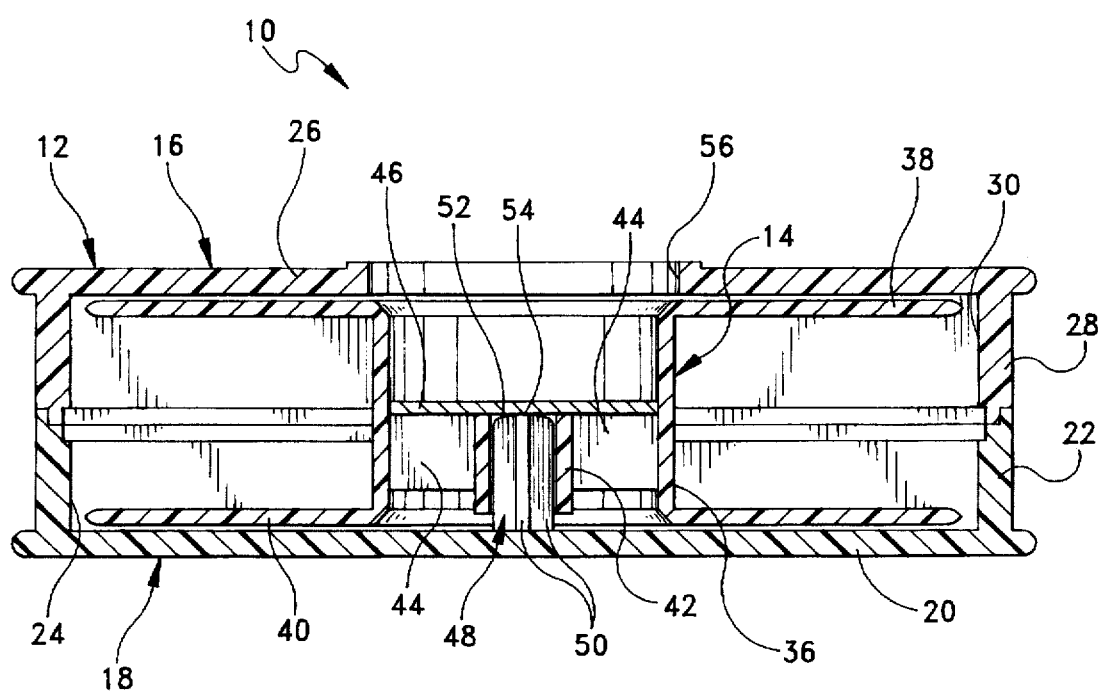
FIG. 2 is a cross-sectional view thereof taken along line 2—2 of FIG. 1.
Figure 3:
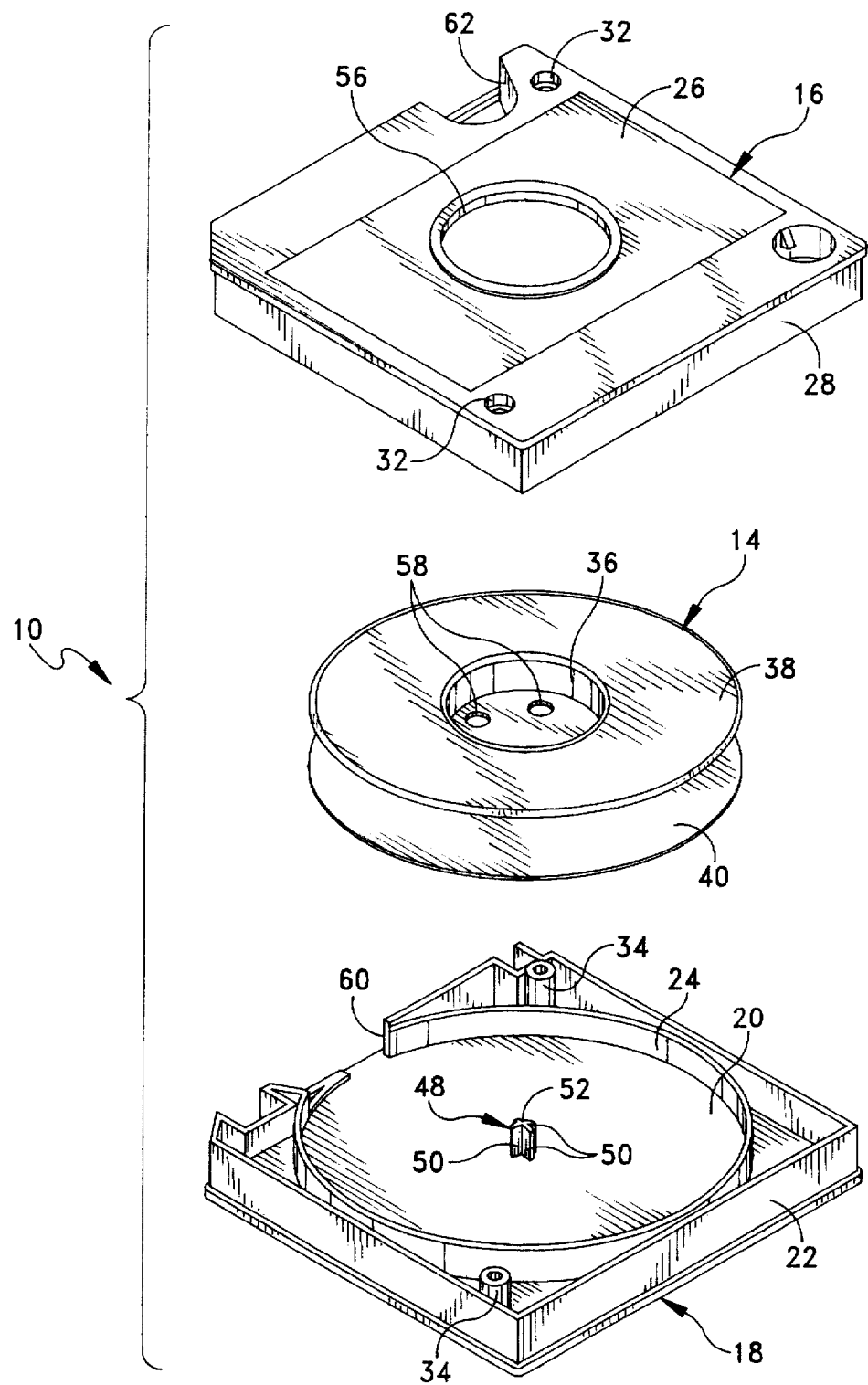
FIG. 3 is an exploded perspective view thereof illustrating the assembly of the upper and lower housing section halves and the reel.

Referring now to the drawings, the microfilm cartridge assembly of the instant invention is illustrated and generally indicated at 10 in FIGS. 1–3. In general, the microfilm cartridge assembly comprises a housing generally indicated at 12, and a reel generally indicated at 14. As will hereinafter be more fully described, the instant microfilm cartridge assembly 10 includes an integral post and hub arrangement which operates to stabilize rotation of the reel 14 within the housing 14 and to reduce friction thereby allowing increased rotation speed of the reel 14 within the housing 12.

Referring to FIG. 3, the housing 12 comprises front and rear housing section halves generally indicated at 16 and 18 respectively. The front and rear housing sections 16, 18 are preferably integrally molded from a durable polymer resin having a low friction factor. The rear housing section 18 includes a rear wall 20, a side wall section 22, and a cylindrical inner retaining wall section 24. The front housing section 16 is generally similar in construction and includes a front wall 26, a side wall section 28, and a cylindrical inner retaining wall section 30. The front and rear housing sections 16, 18 are received in interfitting engagement wherein the outer wall sections 22, 28 cooperate to define a continuous outer wall as illustrated in FIGS. 1 and 2, and the inner retaining wall sections cooperate to define a continuous cylindrical inner retaining wall. The front and rear housing sections 16, 18 are secured in interfitting engagement with threaded fasteners (not shown) which extend through openings 32 in the front wall 16, and are threadedly received in aligned posts 34 on the rear wall 18.

The reel 14 is received into the housing 12 within the interior space defined by the rear and front walls 20, 26, and the interior retaining wall sections 24, 30. The reel 14 comprises an outer hub 36, and front and rear cylindrical flanges 38, 40 respectively, extending radially outwardly from the outer hub 36 for capturing the edges of film wound onto the outer hub 36. The reel 14 further comprises an integral inner hub 42 (FIG. 2) formed concentrically within the outer hub 36 and disposed adjacent to the rear flange 40 of the reel 14. The inner hub 42 is positioned concentrically within the outer hub 36 by integrally formed ribs 44 which extend radially inwardly from the outer hub 36. The reel 14 still further comprises a metallic insert 46 which is received and secured within the interior of the outer hub 36 in a position generally between the front and rear reel flanges 38, 40. The insert 46 is received adjacent to the inner side of the inner hub 42, and forms a bottom wall for the cylindrical hub 42. It is pointed out that the reel 14 is preferably integrally molded from a durable polymer resin, similar to that of the housing 12. The metallic insert 46 is positioned within the center of the reel 14 to provide a rigid engagement point for the spindle of the retrieval apparatus.

To stabilize rotation of the reel 14 within the housing 12, the rear housing section 18 is provided with a post generally indicated at 48 extending perpendicularly inwardly into the interior of the housing 12 from the rear wall 20. The post 48 has a central axis which is centered within the cylindrical retaining wall 24, and has a predetermined maximum height at the central axis. Furthermore, the post 48 has a diameter which is only slightly less than the diameter of the inner hub 42 of the reel 14.

In assembly, the inner hub 42 of the reel 14 is slidably received onto the post 48 of the rear housing section 18 for centering rotation of the reel 14 about the central axis of the post 48. The post 48 and hub 42 prevent the edges of the reel flanges 38, 40 from engaging the internal retaining walls 24, 30 of the housing 12 during rotation of the reel 14. Referring to FIG. 2, it can be seen that the maximum height of the post is slightly greater than the depth of the inner hub 42 of the reel 14 so that the reel 14 is suspended just above the surface of the rear wall 20 of the housing 14. This suspended configuration permits the reel 14 to float within the housing 12, and it thus is operable for reducing friction between the rear flange 40 of the reel 14 and the rear wall 20 of the housing 12.

To reduce friction between the inner surfaces of the inner hub 42 and the outer surface of the post 48, the post 48 is preferably provided with a star-shaped configuration comprising a plurality of ribs 50 which radiate outwardly from the central axis. The ribs 50 effectively maintain the same outside diameter as a solid post, but reduce surface area contact between the post 48 and the hub 42 and thus reduce friction. While the post 48 in the instant embodiment is specifically illustrated as star-shaped including four ribs 50, it is to be understood that other arrangements of the post 48 are suitable within the scope of the invention. To further reduce friction between the post 48 and the hub 42, the upper surface 52 of the post 48 is tapered upwardly to define a single point of contact 54 at the central axis. In this regard, any type of tapering configuration is suitable, including a pyramidal taper, conical taper, and spherical taper. However, most preferably, the upper surface 52 of the post 48 is slightly convex wherein the apex of the convex surface defines a single point of contact with the metallic insert 46 when the reel 14 is received onto the post 48.

In use, the cartridge assembly 10 is received into a retrieval system wherein a spindle of the retrieval system is operative for engagement with the metallic insert 46 of the reel 14. In this connection, the front wall 26 of the housing 12 includes a central aperture 56 for permitting insertion of the spindle into the housing 12, and the insert 46 includes four apertures 58 (only two shown) into which pins (not shown) of the spindle are received. The front and rear housing sections 16, 18 still further include edge openings 60 (FIG. 3 (only shown on the rear section 18) which cooperate to define an opening through which the film moves into and out of the cartridge 10, while the front housing section 16 includes an opening 62 (FIGS. 1 and 3) along the forward side edge thereof for receiving a drive wheel to drive the film out of the cartridge assembly 10.

While the present embodiment is depicted with the post on the rear wall of the housing and the hub incorporated into the reel, it is to be understood that the positions of the hub and the post could be reversed wherein the post is located on the reel and a complementary hub formed on the rear wall of the housing. This arrangement is suitable so long as the post is of a sufficient length to float the reel above the surface of the rear wall of the housing.

It can therefore be seen that the instant invention provides a unique and novel microfilm cartridge assembly 10 which is effective for stabilizing rotation of the reel 14 within the housing 12. The unique arrangement of the post 48 and hub 42 of the assembly 10 effectively reduces friction between the reel 14 and the housing 12, and thus permits faster rotation of the reel 14 during operation. Faster rotation speeds means that film can be transferred at a faster speed thereby enhancing image retrieval speed, reducing transfer time for film loading and unloading, maximizing the capabilities of new higher speed reader-printers, and thus requiring reduced user time. The reduced friction of the cartridge 10 will also permit film loading in old, worn, and out of adjustment retrieval apparatus which would normally be precluded by binding of the prior art designs. Furthermore, the stabilized rotation reduces vibration and noise generated by rotation of the reel 14. Reduced noise levels is an important benefit in large retrieval offices where numerous retrieval machines are operating simultaneously. Accordingly, it can be appreciated that the advantages provided by this invention make the invention a truly desirable and marketable product. For these reasons, the instant invention is believed to represent a significant advancement in the art which has substantial commercial merit.

While there is shown and described herein certain specific structure embodying the invention, it will be manifest to those skilled in the art that various modifications and rearrangements of the parts may be made without departing from the spirit and scope of the underlying inventive concept and that the same is not limited to the particular forms herein shown and described except insofar as indicated by the scope of the appended claims.

We claim:

1. A microfilm cartridge assembly comprising:

a housing including from and rear walls maintained in generally parallel, spaced relation, and further including a centrally located post extending generally perpendicular inwardly into an interior portion of said housing from said rear wall, said post having a predetermined maximum height, said post having a star-shaped configuration defined by a plurality of rib portions radiating outwardly from a central axis of said post; and a reel having a hub centered about an axis of rotation of said reel, said reel being received within said housing with said hub received on said post for rotation thereon.

2. The microfilm cartridge assembly of claim 1 wherein said hub of said reel has a depth which is slightly less than the maximum height of said post such that said reel is suspended above the rearwall of said housing when the hub is received on said post.

3. The microfilm cartridge assembly of claim 2 wherein said post is tapered upwardly to define a single point of contact at a central axis of said post.

4. The microfilm cartridge assembly of claim 3 wherein said post has a generally convex upper surface and the apex of said convex surface defines said point of contact.

5. A microfilm cartridge assembly comprising:

a housing including from and rear walls maintained in generally parallel spaced relation, and further including a centrally located polymeric post extending generally perpendicular inwardly into an interior portion of said housing from said rear wall, said post having a predetermined maximum height, said post further having an upper engagement surface; and a reel having a hub centered about an axis of rotation of said reel, said hub including a metallic bottom wall, said hub having a depth which is slightly less than the height of said post, said reel being received within said housing with said hub received on said post for suspended rotation thereon, said upper engagement surface of said post engaging with the metallic bottom wall of said hub.

6. The microfilm cartridge of claim 5 wherein the upper engagement surface of said post is tapered upwardly to define a single point of contact at a central axis of said post.

7. The microfilm cartridge of claim 6 wherein said post has a generally convex upper surface and the apex of said convex surface defines said point of contact.

8. The microfilm cartridge assembly of claim 5 wherein said post has a star-shaped configuration defined by a plurality of rib portions radiating outwardly from a central axis of said post.

9. A microfilm cartridge assembly comprising:

a housing including front and rear walls maintained in generally parallel, spaced relation;

a reel having a hub and front and rear flanges radiating outwardly from said hub, said reel being received within said housing with said rear flange received adjacent said rear wall; and a post formed on one of said rear wall of said housing and said reel, and a hub formed on the other of said rear wall of said housing and said reel, said post having a star-shaped configuration defined by a plurality of rib portions radiating outwardly from a central axis of said post, said hub having a depth which is less than a height of said post whereby said rear flange is floated above said rear wall of said housing when said reel is received in assembly relation with said housing.

10. The microfilm cartridge assembly of claim 9 wherein said post is tapered upwardly to define a single point of contact at a central axis of said post.

11. The microfilm cartridge assembly of claim 10 wherein said post has a generally convex upper surface and the apex of said convex surface defines said point of contact.

12. A microfilm cartridge assembly comprising:

a housing including front and rear walls maintained in generally parallel spaced relation, and further including a centrally located polymeric post extending generally perpendicular inwardly into an interior portion of said housing from said rear wall, said post having a predetermined maximum height, said post further having an upper engagement surface; and a reel comprising an outer hub centered about an axis of rotation of said reel, and front and rear cylindrical flanges extending radially outwardly from the outer hub for capturing the edges of a film wound onto the outer hub, said reel further comprising an inner hub formed concentrically within the outer hub and disposed adjacent to the rear flange of the reel, said reel still further comprising a metallic insert which is received and secured within said outer hub between the front and rear flanges of the reel, said insert being received adjacent an inner side of the inner hub whereby said insert forms a bottom wall of said inner hub, said inner hub having a depth which is slightly less than the height of said post, said reel being received within said housing with said inner hub received on said post for suspended rotation thereon, said upper engagement surface of said post engaging with the metallic insert which forms the bottom wall of said hub.

13. The microfilm cartridge of claim 12 wherein the upper engagement surface of said post is tapered upwardly to define a single point of contact at a central axis of said post.

14. The microfilm cartridge of claim 13 wherein said post has a generally convex upper surface and the apex of said convex surface defines said point of contact.

15. The microfilm cartridge assembly of claim 12 wherein said post has a star-shaped configuration defined by a plurality of rib portions radiating outwardly from a central axis of said post.

* * * * *